United States Patent
Chang et al.

(10) Patent No.: US 12,292,006 B2
(45) Date of Patent: May 6, 2025

(54) AIRCRAFT PROPULSION SYSTEM WITH MULTI-DIRECTION BLEED VALVE

(71) Applicant: RTX Corporation, Farmington, CT (US)

(72) Inventors: Jui-Lin Chang, Glastonbury, CT (US); Paul R. Hanrahan, Sedona, AZ (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/233,615

(22) Filed: Aug. 14, 2023

(65) Prior Publication Data

US 2024/0052790 A1 Feb. 15, 2024

Related U.S. Application Data

(60) Provisional application No. 63/397,548, filed on Aug. 12, 2022.

(51) Int. Cl.
*F02C 9/18* (2006.01)
*F02C 3/04* (2006.01)

(52) U.S. Cl.
CPC . *F02C 9/18* (2013.01); *F02C 3/04* (2013.01)

(58) Field of Classification Search
CPC .............. F02C 9/18; F02K 3/05; F02K 3/075
See application file for complete search history.

(56) References Cited

U.S. PATENT DOCUMENTS

| | | | |
|---|---|---|---|
| 4,222,234 A | 9/1980 | Adamson | |
| 4,660,767 A | 4/1987 | Scrace | |
| 4,791,783 A | 12/1988 | Neitzel | |
| 5,209,428 A | 5/1993 | Bevilaqua | |
| 5,531,566 A | 7/1996 | Derouet | |
| 11,047,306 B1 | 6/2021 | Millhaem | |
| 2002/0148216 A1* | 10/2002 | Brault | F02C 7/052 60/785 |
| 2006/0277919 A1* | 12/2006 | Martensson | F02C 3/13 60/785 |
| 2009/0297342 A1 | 12/2009 | Laborie | |

(Continued)

FOREIGN PATENT DOCUMENTS

WO 2014022119 A1 2/2014

OTHER PUBLICATIONS

EP Search Report for EP Patent Application No. 23191410.2 dated Jan. 3, 2024.

*Primary Examiner* — Katheryn A Malatek
(74) *Attorney, Agent, or Firm* — Getz Balich LLC

(57) ABSTRACT

An assembly is provided for an aircraft propulsion system. This assembly includes an engine core, a bypass duct and a bleed circuit. The engine core includes a compressor section, a combustor section, a turbine section and a core flowpath extending sequentially through the compressor section, the combustor section and the turbine section. The bypass duct includes a bypass flowpath outside of the engine core. The bleed circuit includes a bleed passage and a flow regulator. The bleed circuit is configured to direct bypass gas through the bleed passage from the bypass flowpath into the core flowpath when the flow regulator is in an open position. The bleed circuit is configured to cutoff gas flow through the bleed passage between the bypass flowpath and the core flowpath when the flow regulator is in a closed position.

17 Claims, 7 Drawing Sheets

(56) References Cited

U.S. PATENT DOCUMENTS

| | | | |
|---|---|---|---|
| 2013/0145744 A1* | 6/2013 | Lo | F01D 17/105 60/226.3 |
| 2016/0138471 A1 | 5/2016 | Van Der Woude | |
| 2017/0234155 A1* | 8/2017 | Lipinski | F01D 25/14 415/1 |
| 2022/0018309 A1 | 1/2022 | Wylie | |

* cited by examiner

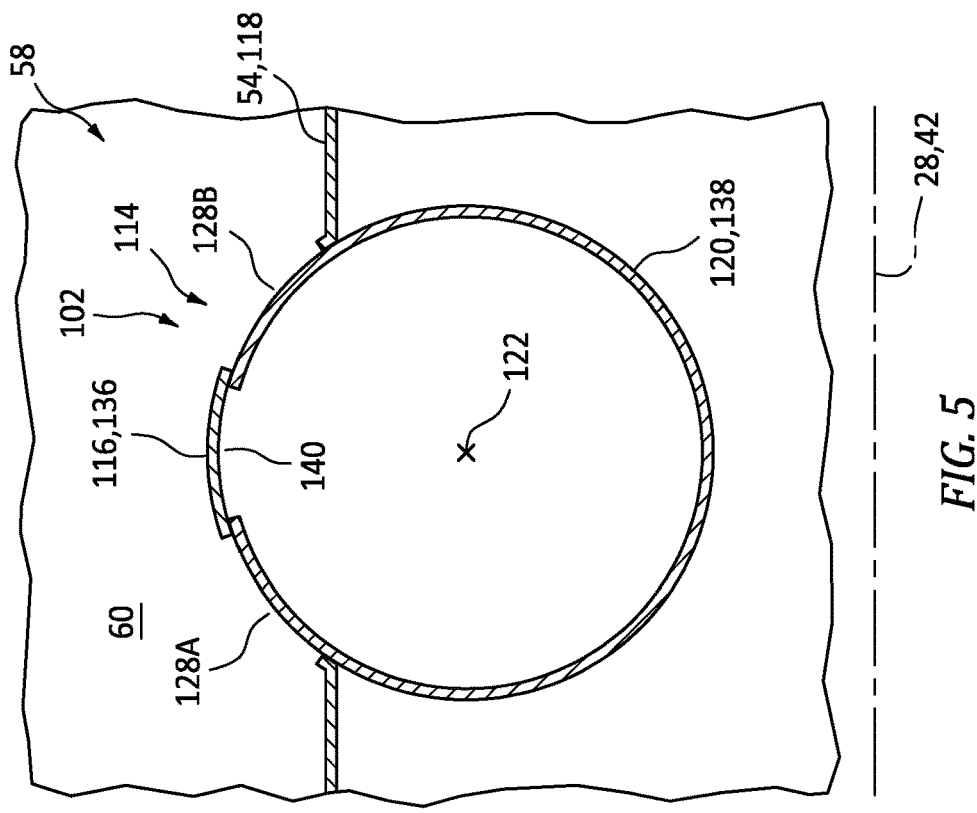
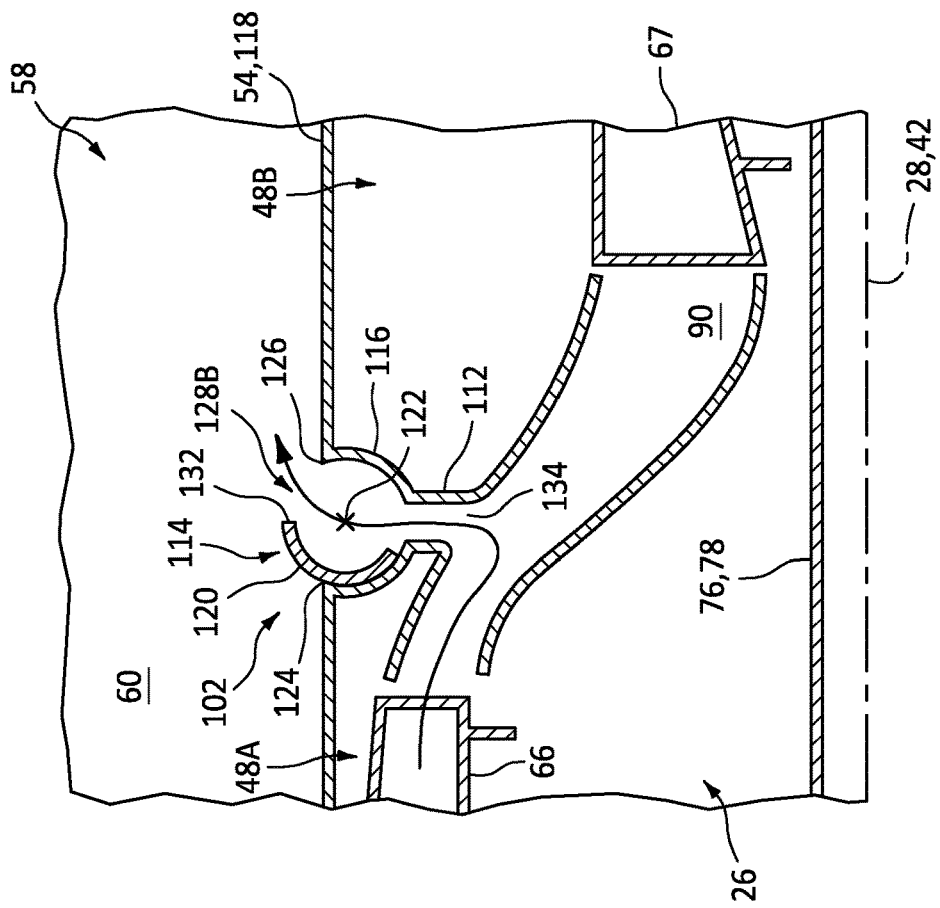
FIG. 5
FIG. 4

AIRCRAFT PROPULSION SYSTEM WITH MULTI-DIRECTION BLEED VALVE

This application claims priority to U.S. Patent Appln. No. 63/397,548 filed Aug. 12, 2022, which is hereby incorporated herein by reference in its entirety.

BACKGROUND OF THE DISCLOSURE

1. Technical Field

This disclosure relates generally to an aircraft and, more particularly, to an aircraft propulsion system.

2. Background Information

Various types and configurations of propulsion systems are known in the art for an aircraft. While these known aircraft propulsion systems have various benefits, there is still room in the art for improvement.

SUMMARY OF THE DISCLOSURE

According to an aspect of the present disclosure, an assembly is provided for an aircraft propulsion system. This assembly includes an engine core, a bypass duct and a bleed circuit. The engine core includes a compressor section, a combustor section, a turbine section and a core flowpath extending sequentially through the compressor section, the combustor section and the turbine section. The bypass duct includes a bypass flowpath outside of the engine core. The bleed circuit includes a bleed passage and a flow regulator. The bleed circuit is configured to direct bypass gas through the bleed passage from the bypass flowpath into the core flowpath when the flow regulator is in an open position. The bleed circuit is configured to cutoff gas flow through the bleed passage between the bypass flowpath and the core flowpath when the flow regulator is in a closed position.

According to another aspect of the present disclosure, another assembly is provided for an aircraft propulsion system. This assembly includes an engine core, a bypass duct, a bleed passage and a flow regulator. The engine core includes a compressor section, a combustor section, a turbine section and a core flowpath extending sequentially through the compressor section, the combustor section and the turbine section. The bypass duct includes a bypass flowpath outside of the engine core. The bleed passage is fluidly coupled with the core flowpath. The flow regulator is configured to: fluidly couple the bleed passage with a first opening into the bypass flowpath during a first mode; and fluidly couple the bleed passage with a second opening into the bypass flowpath during a second mode.

According to still another aspect of the present disclosure, a method is provided for operating an aircraft propulsion system. During this method, bypass gas is directed through a bypass flowpath of the gas turbine engine. Core gas is directed through a core flowpath of the gas turbine engine. Some of the bypass gas is bled from the bypass flowpath during a first mode to provide bled bypass gas. The bled bypass gas is directed into the core flowpath to flow with the core gas using a bleed circuit. Some of the core gas is bled from the core flowpath during a second mode to provide bled core gas. The bled core gas is directed into the bypass flowpath to flow with the bypass gas using the bleed circuit.

The flow regulator may be configured to: fluidly decouple the bleed passage from the first opening during the second mode; and fluidly decouple the bleed passage from the second opening during the first mode.

The flow regulator may be configured to fluidly decouple the bleed passage from the first opening and the second opening during a third mode.

The flow regulator may be configured as or otherwise include a two-way valve.

The bleed circuit may be configured to direct core gas through the bleed passage from the core flowpath into the bypass flowpath when the flow regulator is in a second open position.

The flow regulator may include an outer wall and an inner wall at least partially circumscribed by the outer wall. The outer wall may include an outer wall first aperture facing upstream within the bypass duct and an outer wall second aperture facing downstream within the bypass duct. The inner wall may include an inner wall aperture. The inner wall may be configured to rotate to: the open position where the inner wall aperture is aligned with the outer wall first aperture; the closed position where the inner wall aperture is covered by the outer wall; and the second open position where the inner wall aperture is aligned with the outer wall second aperture.

The compressor section may include a first compressor rotor and a second compressor rotor downstream of the first compressor rotor along the core flowpath. The bleed circuit may be configured to direct the bypass gas into the core flowpath at a location between the first compressor rotor and the second compressor rotor when the flow regulator is in the open position.

The compressor section may include a low pressure compressor section. The bleed circuit may be configured to direct the bypass gas into the core flowpath at a location downstream of the low pressure compressor section when the flow regulator is in the open position.

The flow regulator may be configured to move to: the open position where the flow regulator opens a first aperture into the bypass duct; and the closed position where the flow regulator closes the first aperture.

The flow regulator may be configured to move to a second open position where the flow regulator opens a second aperture into the bypass duct. The flow regulator may close the second aperture when in the closed position.

The flow regulator may close the first aperture when in the second open position. The flow regulator may close the second aperture when in the open position.

The second aperture may be disposed downstream of the first aperture along the bypass flowpath.

The engine core may extend along an axial centerline. The flow regulator may include a valve element configured to open and close the first aperture. The valve element may be configured to move axially along the axial centerline between the open position and the closed position.

The engine core may extend along an axial centerline. The flow regulator may include a valve element configured to open and close the first aperture. The valve element may be configured to move circumferentially about the axial centerline between the open position and the closed position.

The engine core may extend along an axial centerline. The flow regulator may include a valve element configured to open and close the first aperture. The valve element may be configured to rotate circumferentially about a regulator axis between the open position and the closed position. The regulator axis may be angularly offset from the axial centerline.

The bleed circuit may also include a scoop configured to direct the bypass gas from the bypass flowpath into the bleed circuit when the flow regulator is in the open position.

The flow regulator may form the scoop when the flow regulator is in the open position.

The assembly may also include a fan section powered by the engine core. The fan section may be upstream of and configured to direct the bypass gas into the bypass flowpath.

The assembly may also include a second bleed circuit including a second bleed passage and a second flow regulator. The second bleed circuit may be configured to direct bypass gas through the second bleed passage from the bypass flowpath into the core flowpath when the second flow regulator is in an open position. The second bleed circuit may be configured to cutoff gas flow through the second bleed passage between the bypass flowpath and the core flowpath when the second flow regulator is in a closed position.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 4 is a schematic illustration of a portion of the aircraft propulsion system at the bleed circuit with the flow regulator of FIG. 2 in a second open position.

FIG. 5 is a schematic illustration of a portion of the bleed circuit with another flow regulator in a closed position.

DETAILED DESCRIPTION

Figure 1:
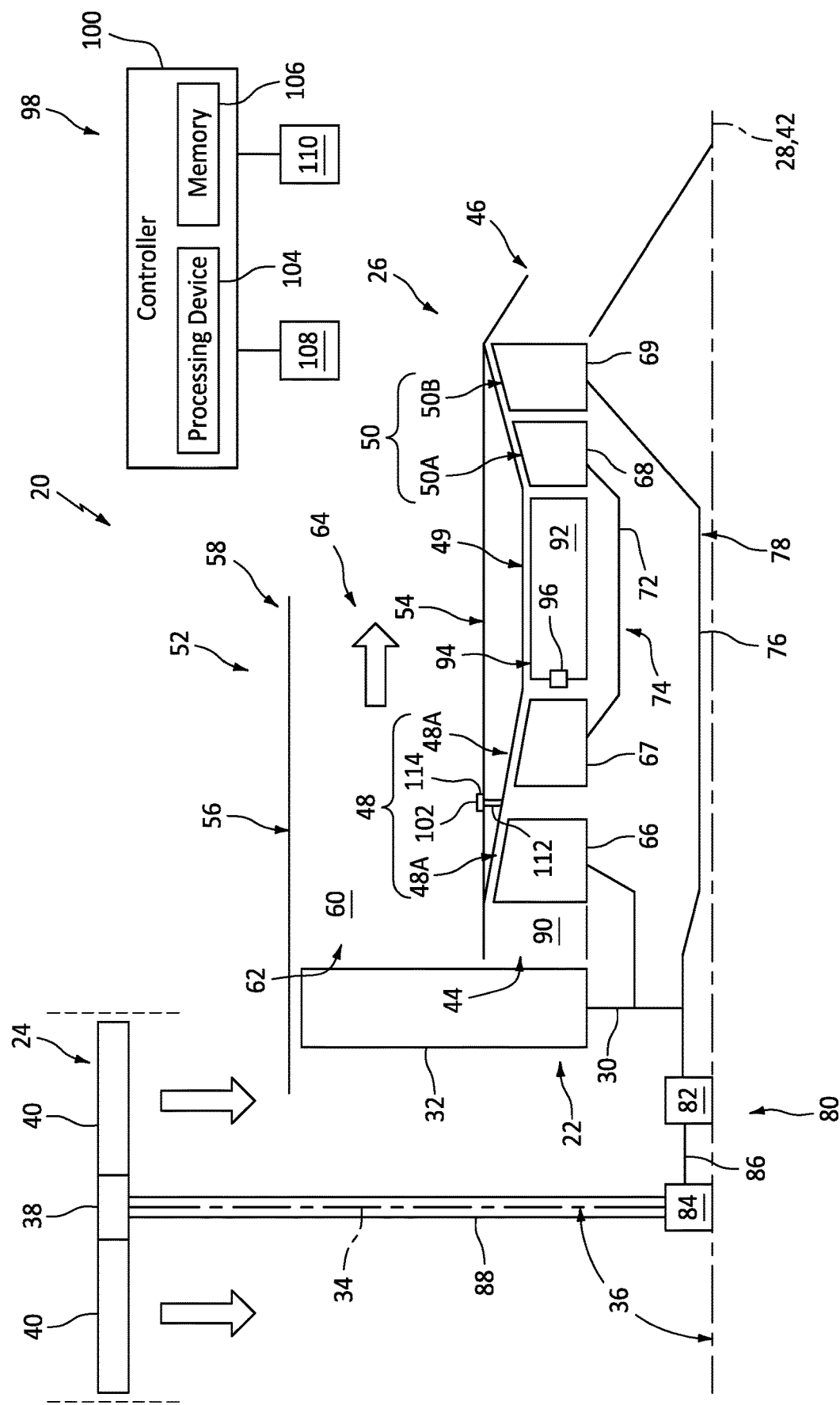
FIG. 1 is a schematic illustration of an aircraft propulsion system.

FIG. 1 schematically illustrates a propulsion system 20 for an aircraft. The aircraft may be an airplane, a helicopter, a drone (e.g., an unmanned aerial vehicle (UAV)), a spacecraft or any other manned or unmanned aerial vehicle. This aircraft may be configured as a vertical take-off and landing (VTOL) aircraft or a short take-off and vertical landing (STOVL) aircraft. The aircraft propulsion system 20 of FIG. 1, for example, is configured to generate power for first direction propulsion (e.g., propulsive thrust) during a first mode of operation and to generate power for second direction propulsion (e.g., propulsive lift) during a second mode of operation, where the first direction is different than (e.g., angularly offset from) the second direction. The first mode may be a horizontal (e.g., forward) flight mode where the first direction propulsion is substantially horizontal (e.g., within 5 degrees, 10 degrees, etc. of a horizontal axis) propulsive thrust. The second mode may be a vertical flight and/or hover mode where the second direction propulsion is substantially vertical (e.g., within 5 degrees, 10 degrees, etc. of a vertical axis) propulsive lift. The aircraft propulsion system 20, of course, may also be configured to generate both the first direction (e.g., horizontal) propulsion and the second direction (e.g., vertical) propulsion during a third (e.g., transition) mode of operation. The aircraft propulsion system 20 of FIG. 1 includes at least one bladed first propulsor rotor 22, at least one bladed second propulsor rotor 24 and a gas turbine engine core 26 configured to rotatably drive the first propulsor rotor 22 and the second propulsor rotor 24.

The first propulsor rotor 22 may be configured as a ducted rotor such as a fan rotor. The first propulsor rotor 22 of FIG. 1 is rotatable about a first rotor axis 28. This first rotor axis 28 is an axial centerline of the first propulsor rotor 22 and may be horizontal when the aircraft is on ground. The first propulsor rotor 22 includes at least a first rotor disk 30 and a plurality of first rotor blades 32 (on visible in FIG. 1); e.g., fan blades. The first rotor blades 32 are distributed circumferentially around the first rotor disk 30 in an annular array. Each of the first rotor blades 32 is connected to and projects radially (relative to the first rotor axis 28) out from the first rotor disk 30.

The second propulsor rotor 24 may be configured as an open rotor such as a propeller rotor or a helicopter (e.g., main) rotor. Of course, in other embodiments, the second propulsor rotor 24 may alternatively be configured as a ducted rotor such as a fan rotor; e.g., see dashed line duct. The second propulsor rotor 24 of FIG. 1 is rotatable about a second rotor axis 34. This second rotor axis 34 is an axial centerline of the second propulsor rotor 24 and may be vertical when the aircraft is on the ground. The second rotor axis 34 is angularly offset from the first rotor axis 28 by an included angle 36; e.g., an acute angle or a right angle. This included angle 36 may be between sixty degrees (60°) and ninety degrees (90°); however, the present disclosure is not limited to such an exemplary relationship. The second propulsor rotor 24 includes at least a second rotor disk 38 and a plurality of second rotor blades 40; e.g., open rotor blades. The second rotor blades 40 are distributed circumferentially around the second rotor disk 38 in an annular array. Each of the second rotor blades 40 is connected to and projects radially (relative to the second rotor axis 34) out from the second rotor disk 38.

The engine core 26 extends axially along a core axis 42 between and to a forward, upstream airflow inlet 44 of the engine core 26 and an aft, downstream exhaust 46 of the engine core 26. The core axis 42 may be an axial centerline of the engine core 26 and may be horizontal when the aircraft is on the ground. This core axis 42 may be parallel (e.g., coaxial) with the first rotor axis 28 and, thus, angularly offset from the second rotor axis 34. The engine core 26 includes a compressor section 48, a combustor section 49 and a turbine section 50. The compressor section 48 of FIG. 1 includes a low pressure compressor (LPC) section 48A and a high pressure compressor (HPC) section 48B. The turbine section 50 of FIG. 1 includes a high pressure turbine (HPT) section 50A and a low pressure turbine (LPT) section 50B.

The engine sections 48A-50B are arranged sequentially along the core axis 42 within an engine housing 52. This engine housing 52 includes an inner case 54 (e.g., a core case) and an outer case 56 (e.g., a fan case). The inner case 54 may house one or more of the engine sections 48A-50B; e.g., the engine core 26. The outer case 56 may house the first propulsor rotor 22. The outer case 56 of FIG. 1 also axially overlaps and extends circumferentially about (e.g., completely around) the inner case 54 thereby at least partially forming a (e.g., annular) bypass duct 58. The bypass duct 58 includes a (e.g., annular) bypass flowpath 60 disposed outside (e.g., radially outboard) of the engine core 26. The bypass flowpath 60 extends axially through the bypass duct 58, along the engine core 26 and its core axis 42, between and to a forward, upstream airflow inlet 62 of the bypass duct 58 and an aft, downstream exhaust 64 of the bypass duct 58.

Each of the engine sections 48A, 48B, 50A and 50B includes a bladed rotor 66-69 within that respective engine section 48A, 48B, 50A and 50B. Each of these bladed rotors 66-69 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The HPC rotor 67 is connected to the HPT rotor 68 through a high speed shaft 72. At least (or only) these engine components 67, 68 and 72 collectively form a high speed rotating structure 74 of the aircraft propulsion system 20. This high speed rotating structure 74 and its components 67, 68 and 72 are rotatable about the core axis 42. The first propulsor rotor 22 and the LPC rotor 66 are connected to the LPT rotor 69 through a low speed shaft 76. At least (or only) these engine components 22, 66, 69 and 76 collectively form a low speed rotating structure 78 of the aircraft propulsion system 20. This low speed rotating structure 78 and its components 22, 66, 69 and 76 are rotatable about the core axis 42. The low speed rotating structure 78 and, more particularly, its low speed shaft 76 may project axially through a bore of the high speed rotating structure 74 and its high speed shaft 72.

The aircraft propulsion system 20 of FIG. 1 includes a powertrain 80 that couples the low speed rotating structure 78 to the second propulsor rotor 24. The powertrain 80 of FIG. 1 includes a transmission 82 and a gear system 84; e.g., bevel gearing. The powertrain 80 of FIG. 1 also includes one or more shafts 86 and 88 and/or other torque transmission devices.

An input to the transmission 82 is connected to the low speed rotating structure 78 and its low speed shaft 76. An output of the transmission 82 is connected to an input of the gear system 84 through the transmission output shaft 86. This transmission 82 may be configured to selectively couple (e.g., transfer mechanical power between) the low speed rotating structure 78 and the transmission output shaft 86. During the first mode of operation, for example, the transmission 82 may be configured to decouple the low speed rotating structure 78 from the transmission output shaft 86, thereby decoupling the low speed rotating structure 78 from the second propulsor rotor 24. During the second mode of operation (and the third mode of operation), the transmission 82 may be configured to couple the low speed rotating structure 78 with the transmission output shaft 86, thereby coupling the low speed rotating structure 78 with the second propulsor rotor 24. The transmission 82 may be configured as a clutched transmission or a clutchless transmission.

An output of the gear system 84 is connected to the second propulsor rotor 24 through the second propulsor shaft 88. This gear system 84 provides a coupling between the transmission output shaft 86 rotating about the axis 28, 42 and the second propulsor shaft 88 rotating about the second rotor axis 34. The gear system 84 may also provide a speed change mechanism between the transmission output shaft 86 and the second propulsor shaft 88. The gear system 84, however, may alternatively provide a 1:1 rotational coupling between the transmission output shaft 86 and the second propulsor shaft 88 such that these shafts 86 and 88 rotate at a common (e.g., the same) speed. Furthermore, in some embodiments, the gear system 84 and the transmission output shaft 86 may be omitted where the functionality of the gear system 84 is integrated into the transmission 82. In still other embodiments, the transmission 82 may be omitted where decoupling of the second propulsor rotor 24 is not required.

During operation of the aircraft propulsion system 20, air enters the engine core 26 through the airflow inlet 44. This air is directed into a (e.g., annular) core flowpath 90 which extends sequentially through the LPC section 48A, the HPC section 48B, the combustor section 49, the HPT section 50A and the LPT section 50B to the exhaust 46. The air within this core flowpath 90 may be referred to as core gas.

The core gas is compressed by the LPC rotor 66 and the HPC rotor 67 and directed into a (e.g., annular) combustion chamber 92 of a (e.g., annular) combustor 94 in the combustor section 49. Fuel is injected into the combustion chamber 92 through one or more fuel injectors 96 (one visible in FIG. 1) and mixed with the compressed core gas to provide a fuel-air mixture. This fuel-air mixture is ignited and combustion products thereof flow through and sequentially cause the HPT rotor 68 and the LPT rotor 69 to rotate. The rotation of the HPT rotor 68 drives rotation of the high speed rotating structure 74 and its HPC rotor 67. The rotation of the LPT rotor 69 drives rotation of the low speed rotating structure 78 and its LPC rotor 66 and its first propulsor rotor 22; e.g., during the first, second and third modes of operation. The rotation of the low speed rotating structure 78 may also drive rotation of the second propulsor rotor 24 through the system components 82, 84, 86 and 88 during a select mode or modes of operation; e.g., the second and the third modes of operation. However, during the first mode of operation, the transmission 82 may decouple the low speed rotating structure 78 from the second propulsor rotor 24 such that the low speed rotating structure 78 does not drive rotation of the second propulsor rotor 24. The second propulsor rotor 24 may thereby be stationary (or windmill) during the first mode of operation.

During the first and third modes of operation, the rotation of the first propulsor rotor 22 propels bypass gas (separate from the core gas) through the aircraft propulsion system 20 and its bypass flowpath 60 to provide the first direction propulsion; e.g., the forward, horizontal thrust. During the second and third modes of operation, the rotation of the second propulsor rotor 24 propels additional air (separate from the core gas and the bypass gas) to provide the second direction propulsion; e.g., vertical lift. The aircraft may thereby takeoff, land and/or otherwise hover during the second and third modes of operation, and the aircraft may fly forward or otherwise move during the first and the third modes of operation.

During each mode of operation, the low speed rotating structure 78 is coupled to the first propulsor rotor 22. As described above, rotation of the first propulsor rotor 22 may generate horizontal thrust during the first and third modes of operation to propel the aircraft horizontally forward. However, generating such horizontal thrust (or significant amounts of horizontal thrust) may hinder and/or be less advantageous for certain aircraft takeoff, landing and/or hovering maneuvers during the second mode of operation. Furthermore, producing horizontal thrust with the first propulsor rotor 22 during the second mode of operation may also take away engine core power that could otherwise be provided to the second propulsor rotor 24 for vertical aircraft lift. The aircraft propulsion system 20 of FIG. 1 is therefore provided with a thrust control system 98. This thrust control system 98 is configured to reduce (or ideally eliminate) the horizontal thrust generated by the first propulsor rotor 22 during at least the second mode of operation.

The thrust control system 98 of FIG. 1 includes the engine core 26 and an engine controller 100. The thrust control system 98 also include a bleed circuit 102 for selectively flowing gas between the bypass flowpath 60 and the core flowpath 90.

The engine controller 100 may be implemented with a combination of hardware and software. The hardware may include at least one processing device 104 and a memory 106. The processing device 104 may include one or more single-core and/or multi-core processors. The hardware may also or alternatively include analog and/or digital circuitry other than that described above.

The memory 106 is configured to store software (e.g., program instructions) for execution by the processing device 104, which software execution may control and/or facilitate performance of one or more operations such as those described below. The memory 106 may be a non-transitory computer readable medium. For example, the memory 106 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The engine controller 100 is configured to selectively control operation of the engine core 26. The engine controller 100, for example, may signal a fuel flow device 108 (e.g., a fuel pump, a fuel valve, etc.) to regulate (e.g., maintain, increase or decrease) fuel delivery to the fuel injectors 96. The engine controller 100 may signal an actuator 110 coupled to a variable vane array within one of the engine sections 48 and 50 to regulate (e.g., maintain, increase or decrease) gas flow through the variable vane array. The engine controller 100, of course, may also or alternatively signal one or more other devices within the aircraft propulsion system 20 to influence operation of the engine core 26. The engine controller 100 may still also provide control signals to the bleed circuit 102 to facilitate bleed circuit operation as described below.

During the first mode of operation, the engine core 26 is operated by the engine controller 100 to rotate the low speed rotating structure 78 at a relatively fast first rotational speed about the axis 28, 42. During the second mode of operation, the engine core 26 is operated by the engine controller 100 to rotate the low speed rotating structure 78 at a relatively slow second rotational speed about the axis 28, 42. The second rotational speed is selected to be less than the first rotational speed. The second rotational speed, for example, may be equal to or less than eighty percent (80%) of the first rotational speed. More particularly, the second rotational speed may be between fifty-five percent (55%) and seventy-five percent (75%) of the first rotational speed. The present disclosure, however, is not limited to such an exemplary relationship.

Rotational speed of the first propulsor rotor 22 may be directly related to the propulsive thrust generated by the first propulsor rotor 22. Therefore, since the low speed rotating structure 78 drives rotation of the first propulsor rotor 22, decreasing the rotational speed of the low speed rotating structure 78 may reduce the propulsive thrust generated by the first propulsor rotor 22. The first propulsor rotor 22 may thereby generate less propulsive thrust during the second mode of operation where the low speed rotating structure 78 is rotating at the relatively slow second rotational speed than during the first mode of operation where the low speed rotating structure 78 is rotating at the relatively fast first rotational speed. However, reducing the rotational speed of the low speed rotating structure 78 may also decrease work and, thus, compression performed by the LPC rotor 66. This may in turn reduce power generated by the engine core 26 that is available for driving the second propulsor rotor 24 during the second mode of operation. To at least partially compensate for the reduction in work performed by the LPC rotor 66 while rotating at the second rotational speed, the bleed circuit 102 is configured to bleed some of the bypass gas from the bypass flowpath 60, and direct that bled bypass gas into the core flowpath 90 to supplementally charge (e.g., supercharge) the core gas. In particular, during at least the second mode of operation, the bleed circuit 102 may direct the bled bypass gas into the core flowpath 90 at (e.g., on, adjacent or proximate) a location downstream of the LPC section 48A and its LPC rotor 66; e.g., between the LPC section 48A and the HPC section 48B/between the LPC rotor 66 and the HPC rotor 67. This charging of the core gas with the bled bypass gas may also reduce likelihood of engine core flutter.

Figure 3:
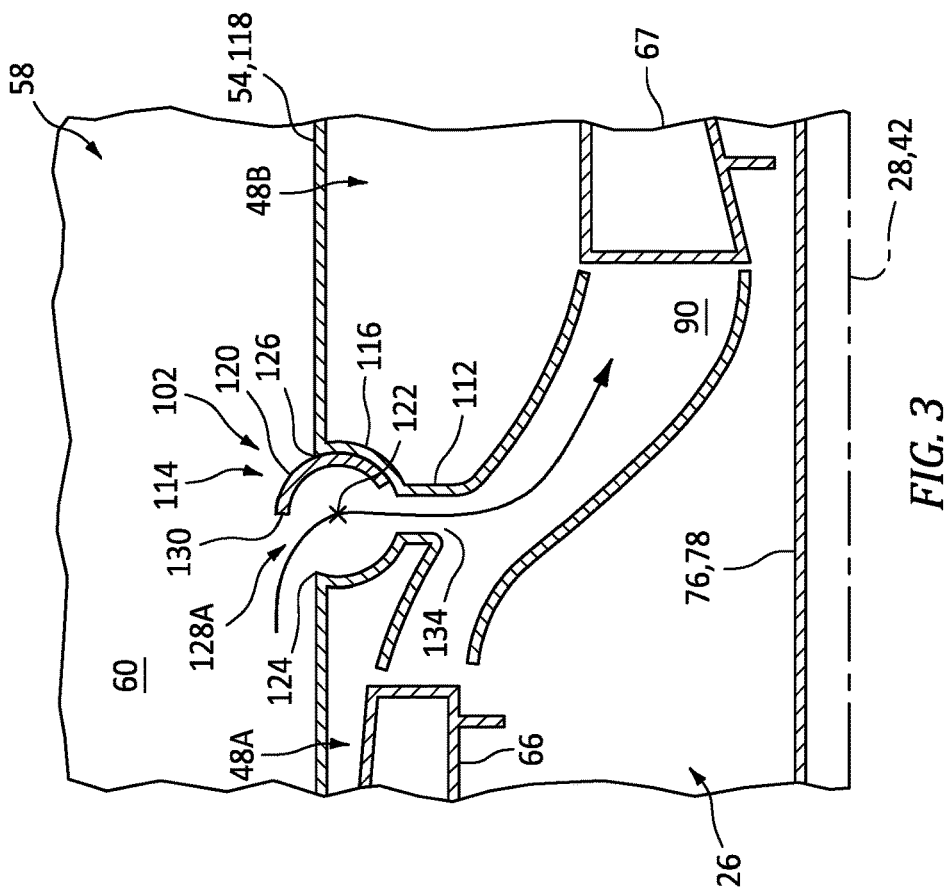
FIG. 3 is a schematic illustration of a portion of the aircraft propulsion system at the bleed circuit with the flow regulator of FIG. 2 in a first open position.
Figure 2:
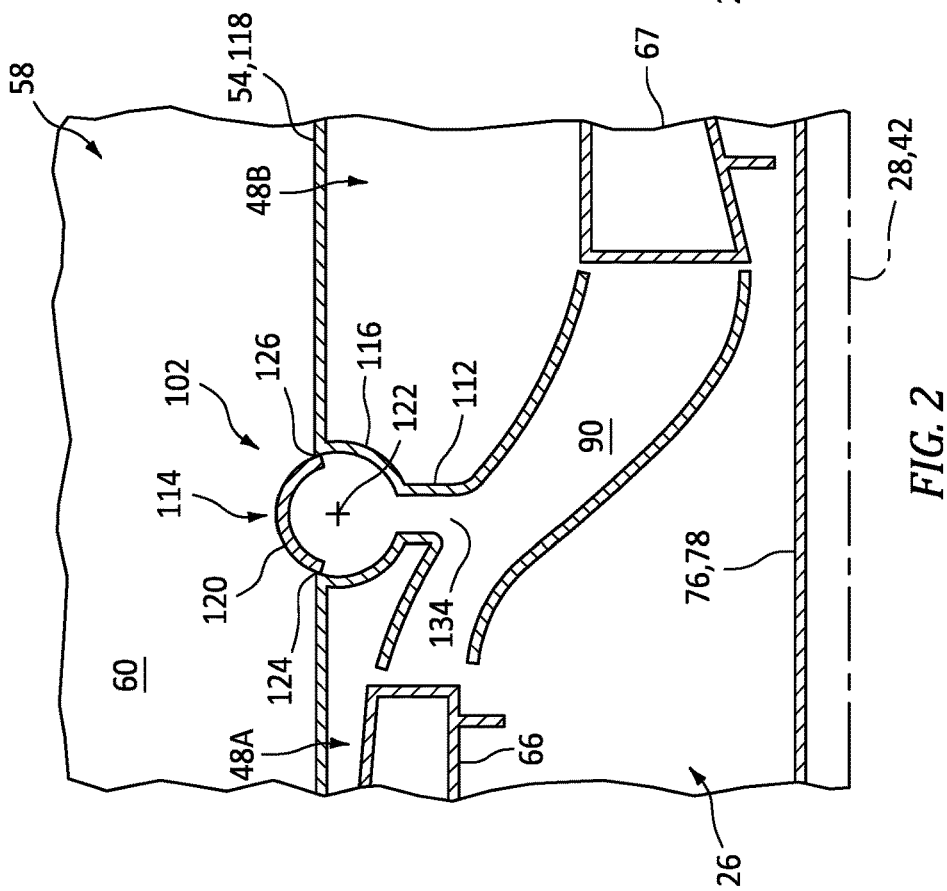
FIG. 2 is a schematic illustration of a portion of the aircraft propulsion system at a bleed circuit with a flow regulator in a closed position.

Referring to FIGS. 2 and 3, the bleed circuit 102 includes a bleed passage 112 and a flow regulator 114. The bleed passage 112 may be configured as or otherwise include a duct, a tube, a conduit and/or any other fluid coupling structure with an internal flowpath. The bleed passage 112 of FIGS. 2 and 3 extends (e.g., radially relative to the core axis 42) between and to the core flowpath 90 and the flow regulator 114. The bleed passage 112 may thereby fluidly couple the flow regulator 114 to the core flowpath 90.

The flow regulator 114 may be configured as a valve. The flow regulator 114 of FIGS. 2 and 3, for example, includes a stationary valve base 116 which may be connected to and/or formed part of a wall 118 of the bypass duct 58. The flow regulator 114 of FIGS. 2 and 3 also includes a (e.g., arcuate) valve element 120 nested with the valve base 116 and rotatable about an axis 122 of the flow regulator 114, which regulator axis 122 may be angularly offset from (e.g., perpendicular to) the core axis 42. The valve element 120 may rotate about the regulator axis 122 between/to various positions including a (e.g., fully) closed position of FIG. 2 and an (e.g., fully) open position of FIG. 3. In the closed position of FIG. 2, the valve element 120 is rotated to cover (e.g., extend uninterrupted across) an opening in the valve base 116, which base opening extends between and to a forward, upstream edge 124 of the base opening and an aft, downstream edge 126 of the base opening. In this position, the flow regulator 114 and its valve element 120 fluidly decoupled the bleed passage 112 and, thus, the core flowpath 90 from the bypass flowpath 60. By contrast, in the open position of FIG. 3, the valve element 120 is rotated to open a forward, upstream facing first aperture 128A (e.g., a window, a port, etc.) into the bypass flowpath 60. This first aperture 128A extends between and to the base opening upstream edge 124 and an upstream edge 130 of the valve element 120. In this position, the valve element 120 may also form a (e.g., ram) scoop for directing the bypass gas bleed from the bypass flowpath 60 into the bleed circuit 102.

During aircraft propulsion system operation, the valve element 120 may be arranged in its closed position of FIG. 2 for the first mode of operation; e.g., for forward thrust operation. With the valve element 120 in the closed position, gas flow through the bleed circuit 102 and its bleed passage 112 between the core flowpath 90 and the bypass flowpath 60 is cut off. Therefore, (e.g., all of) the core gas may be used for engine core operation and/or (e.g., all of) the bypass gas may be used for producing thrust. However, for the second mode of operation (e.g., for vertical thrust operation) where work/compression performed by the LPC rotor 66 of FIG. 1 is reduced, the valve element 120 may be arranged in its open position of FIG. 3. With the valve element 120 in the open position, the bleed circuit 102 bleeds (e.g., captures, redirects, etc.) some of the bypass gas from the bypass flowpath 60, and directs this bled bypass gas through the open flow regulator 114 and the bleed passage 112 and into the core flowpath 90. The bypass gas directed into the core flowpath 90 flows (and mixes) with the core gas thereby further charging the core gas provided to the HPC section 48B of FIG. 1 and its HPC rotor 67.

During the second mode of operation, gas pressure within the core flowpath 90 between the LPC section 48A and the HPC section 48B may be equal to or less than gas pressure within the bypass flowpath 60 since the LPC rotor 66 is rotating at a relatively slow speed. This pressure differential may facilitate the flow of the bled bypass gas through the bleed circuit 102 from the bypass flowpath 60 to the core flowpath 90. By contrast, during the first mode of operation where the LPC rotor 66 is rotating at a relatively fast speed, the gas pressure within the core flowpath 90 between the LPC section 48A and the HPC section 48B may be greater than the gas pressure within the bypass flowpath 60. The flow of the bled bypass gas through the bleed circuit 102 from the bypass flowpath 60 to the core flowpath 90 during the second mode of operation may also or alternatively be facilitated by provision of the scoop, which may function as a ram air scoop.

In some embodiments, the flow regulator 114 may be configured as a multi-way valve; e.g., a two-way valve, a multi-direction bleed valve. For example, referring to FIG. 4, the valve element 120 may rotate about the regulator axis 122 to a second (e.g., fully) open position. The second open position of FIG. 4, the valve element 120 is rotated to open an aft, downstream facing second aperture 128B (e.g., a window, a port, etc.) into the bypass flowpath 60. This second aperture 128B extends between and to the base opening downstream edge 126 and a downstream edge 132 of the valve element 120, and the second aperture 128B of FIG. 4 is located axially aft and downstream of the first aperture 128A of FIG. 3. In the open position of FIG. 4, the valve element 120 may form an exhaust for bled core gas. For example, during startup of the engine core 26 of FIG. 1, the low speed rotating structure 78 may be stationary or rotate very slowly while the high speed rotating structure 74 is rotated by a starter motor. The rotation of the HPC rotor 67 draws the core gas through the LPC section 48A and past an opening 134 to the bleed passage 112 at an outer side of the core flowpath 90. The gas pressure within the core flowpath 90 between the LPC section 48A and the HPC section 48B therefore may be greater than the gas pressure within the bypass flowpath 60 since the first propulsor rotor 22 is stationary or rotating very slowly. To provide a certain compression and/or volume of the core gas to the combustor 94 for engine core startup, some of the core gas may be bleed via the bleed circuit 102 from the core flowpath 90 and exhausted into the bypass flowpath 60.

Figure 7:
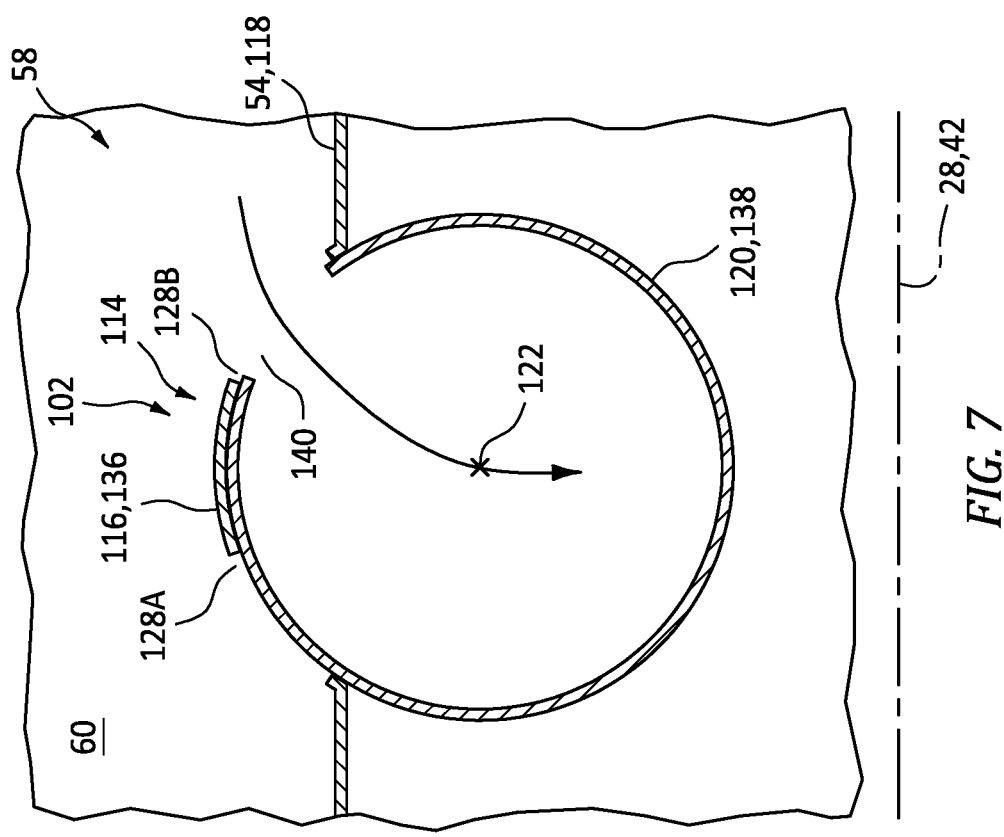
FIG. 7 is a schematic illustration of a portion of the bleed circuit with the flow regulator of FIG. 5 in a second open position.
Figure 6:
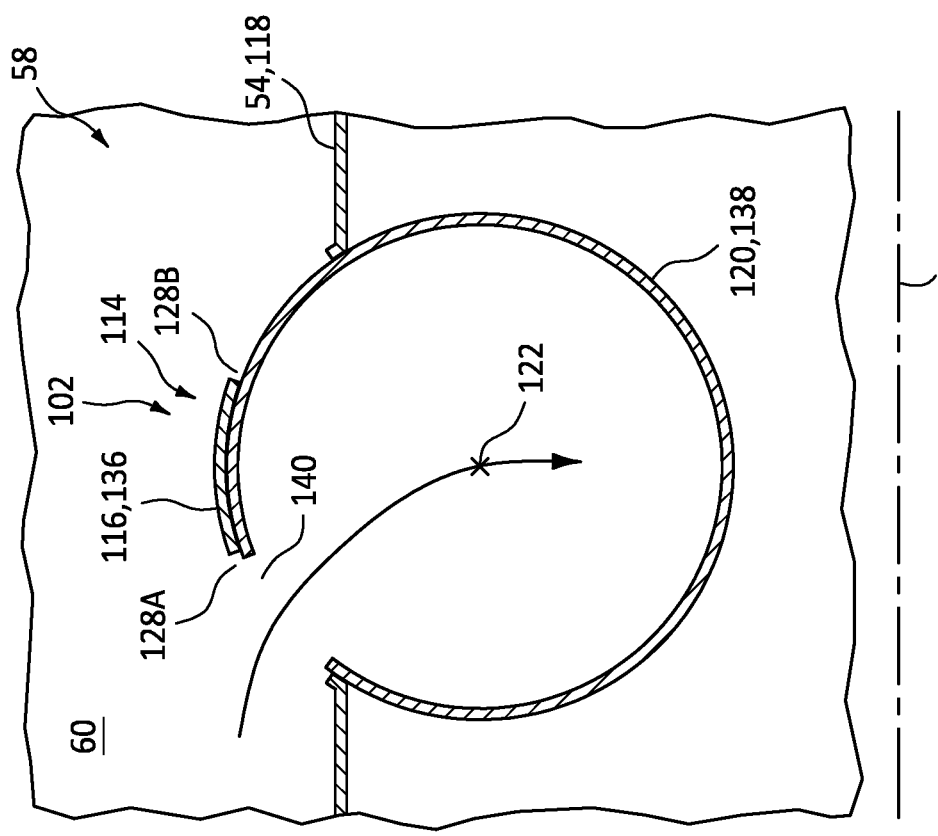
FIG. 6 is a schematic illustration of a portion of the bleed circuit with the flow regulator of FIG. 5 in a first open position.

In some embodiments, referring to FIGS. 5-7, the valve base 116 may be configured as or otherwise include an (e.g., arcuate) outer wall 136. This outer wall 136 extends circumferentially about the regulator axis 122 between a first (e.g., forward, upstream) segment of the bypass duct wall 118 and a second (e.g., aft, downstream) segment of the bypass duct wall 118. The outer wall 136 includes one or more of the apertures 128A and 128B (generally referred to as "128") (e.g., outer wall apertures), where each aperture 128 projects radially (relative to the regulator axis 122) through the outer wall 136.

The valve element 120 of FIGS. 5-7 may be configured as a cylindrical (or arcuate) inner wall 138 nested with and moveable (e.g., slidable, rotatable, etc.) relative to the outer wall 136. The inner wall 138, for example, may extend circumferentially about (e.g., completely around) the regulator axis 122. This inner wall 138 includes at least (or only) one inner wall/element aperture 140; e.g., window, port, etc. This element aperture 140 projects radially (relative to the regulator axis 122) through the inner wall 138.

When the valve element 120 is in its closed position of FIG. 5, the element aperture 140 is misaligned with the first aperture 128A and the second aperture 128B. The element aperture 140, for example, may be positioned circumferentially between (and not overlapped by) the first aperture 128A and the second aperture 128B. A first (e.g., continuous, non-perforated) portion of the inner wall 138 may thereby (e.g., completely) cover and block the first aperture 128A. A second (e.g., continuous, non-perforated) portion of the inner wall 138 may similarly (e.g., completely) cover and block the second aperture 128B.

When the valve element 120 is in its first open position (e.g., scoop position) of FIG. 6, the element aperture 140 is aligned with the first aperture 128A. The element aperture 140, for example, may be positioned to overlap the first aperture 128A such that the bypass gas may pass (e.g., unobstructed) through the first aperture 128A and the element aperture 140 into the bleed circuit 102. Since the element aperture 140 is aligned with the first aperture 128A and thereby misaligned with the second aperture 128B, the second aperture 128B may be closed by a (e.g., continuous, non-perforated) portion of the inner wall 138.

When the valve element 120 is in its second open position (e.g., exhaust position) of FIG. 7, the element aperture 140 is aligned with the second aperture 128B. The element aperture 140, for example, may be positioned to overlap the second aperture 128B such that the core gas may pass (e.g., unobstructed) through the element aperture 140 and the second aperture 128B out of the bleed circuit 102 and into the bypass flowpath 60. Since the element aperture 140 is aligned with the second aperture 128B and thereby misaligned with the first aperture 128A, the first aperture 128A may be closed by a (e.g., continuous, non-perforated) portion of the inner wall 138.

In some embodiments, referring to FIGS. 2-7, the flow regulator 114 may be configured to selectively open (one at a time) the first aperture 128A or the second aperture 128B. In such embodiments, the first aperture 128A may be utilized for directing the bled bypass gas from the bypass flowpath 60 to the core flowpath 90. The second aperture 128B may be utilized for directing the bled core gas from the core flowpath 90 to the bypass flowpath 60. In other embodiments however, referring to FIGS. 8-11, the flow regulator 114 may be configured with a (e.g., single) common aperture 142. For example, during the second mode of operation where the gas pressure within the core flowpath 90 at the opening 134 (see FIGS. 1 and 2) is less than the gas pressure within the bypass flowpath 60, the aperture 142 may be utilized for directing the bled bypass gas from the bypass flowpath 60 to the core flowpath 90. However, during the startup mode of operation where the gas pressure within the core flowpath 90 at the opening 134 (see FIGS. 1 and 2) is greater than the gas pressure within the bypass flowpath 60, the aperture 142 may be utilized for directing the bled core gas from the core flowpath 90 to the bypass flowpath 60.

Figure 9:
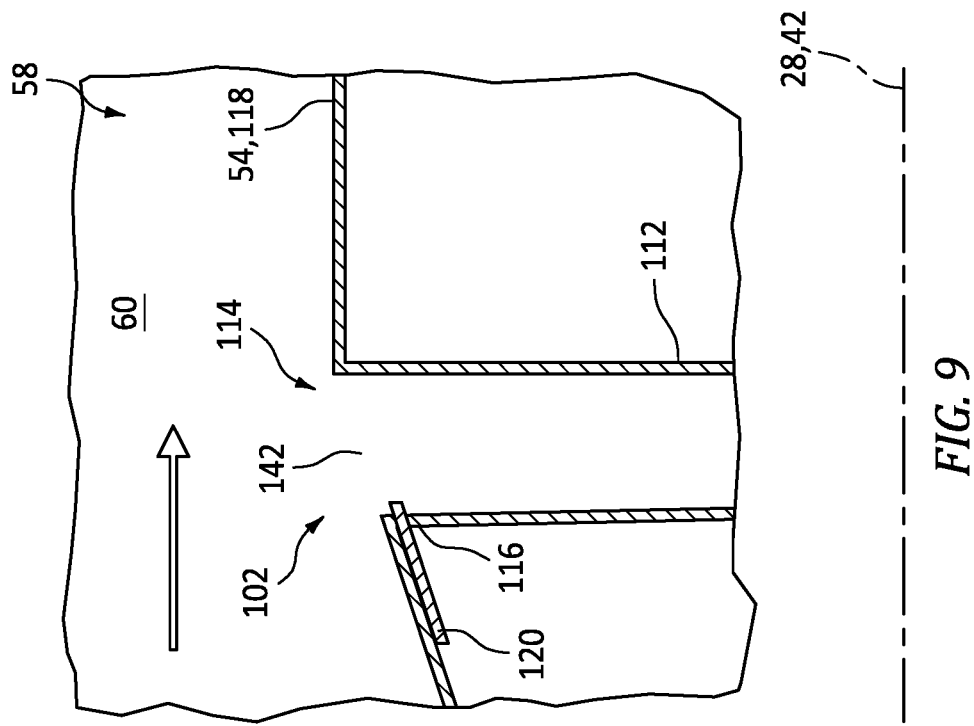
FIG. 9 is a schematic illustration of a portion of the bleed circuit with the flow regulator of FIG. 8 in an open position.
Figure 8:
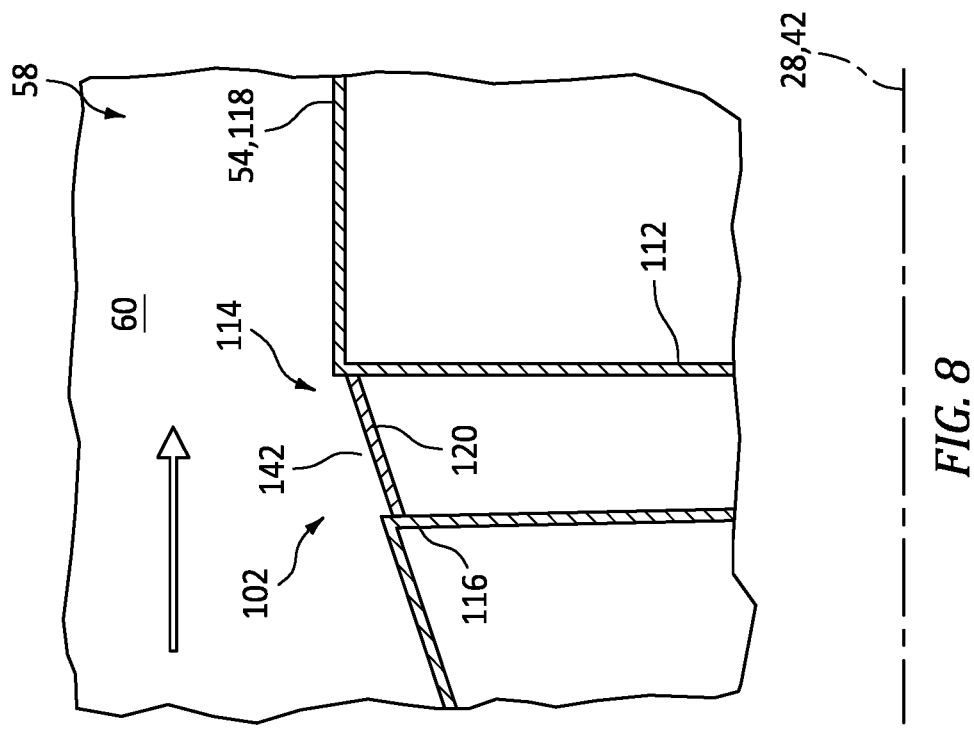
FIG. 8 is a schematic illustration of a portion of the bleed circuit with another flow regulator in a closed position.

In some embodiments, referring to FIGS. 8 and 9, the valve element 120 may be configured to move axially along the axis 28, 42/along the bypass duct wall 118 between the closed position of FIG. 8 and the open position of FIG. 9. In the closed position of FIG. 8, a (e.g., continuous, non-perforated) portion of the valve element 120 may (e.g., completely) cover and block the aperture 142. In the open position of FIG. 9, the valve element 120 may uncover the aperture 142 such that the bypass gas or the core gas may pass (e.g., unobstructed) through the aperture 142.

Figure 11:
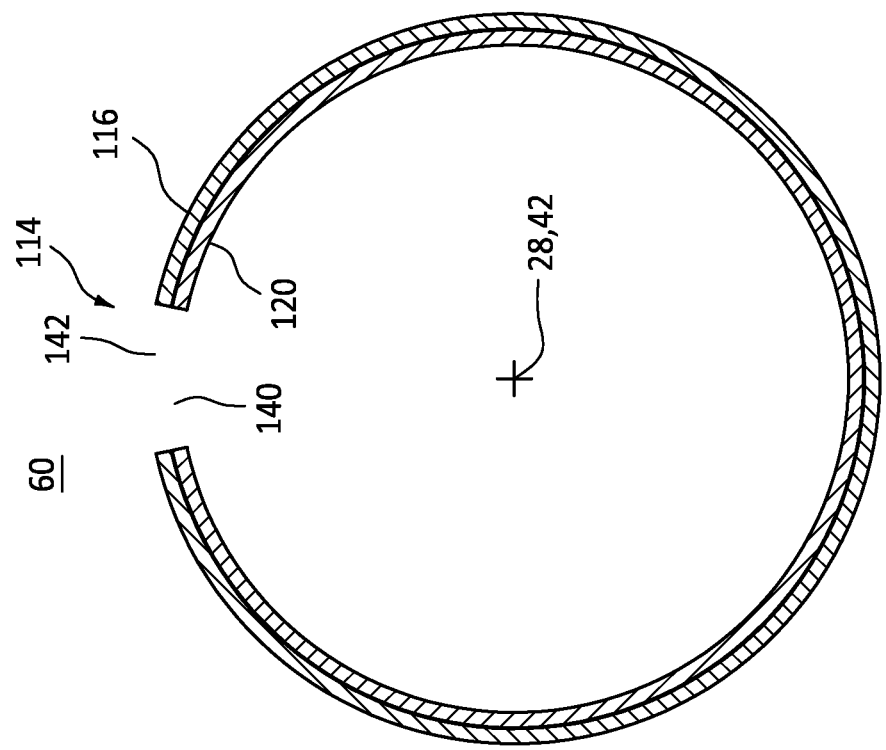
FIG. 11 is a schematic illustration of a portion of the flow regulator of FIG. 10 in an open position.
Figure 10:
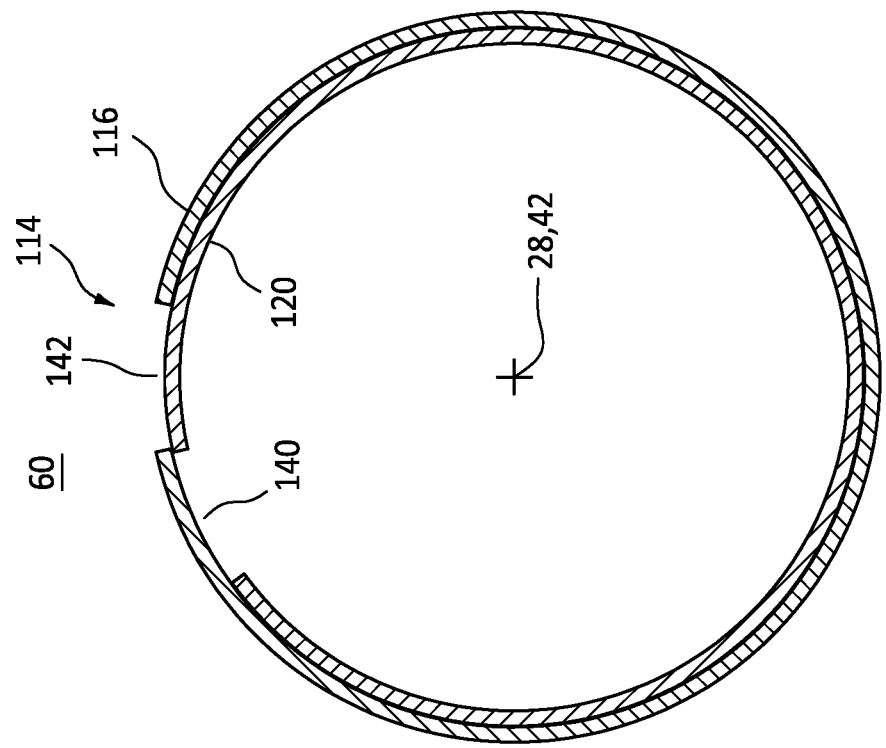
FIG. 10 is a schematic illustration of a portion of another flow regulator in a closed position.

In some embodiments, referring to FIGS. 10 and 11, the valve element 120 may be configured to move circumferentially about the axis 28, 42/along the bypass duct wall 118 between the closed position of FIG. 10 and the open position of FIG. 11. In the closed position of FIG. 10, a (e.g., continuous, non-perforated) portion of the valve element 120 may (e.g., completely) cover and block the aperture 142. In the open position of FIG. 11, the element aperture 140 may be positioned to overlap the aperture 142 such that the bypass gas or the core gas may pass (e.g., unobstructed) through the apertures 140 and 142.

In some embodiments, the flow regulator 114 may include a single first aperture 128A, a single second aperture 128B or a single common aperture 142. In other embodiments, the flow regulator 114 may include more than one of any of those apertures 128A, 128B, 142.

In some embodiments, the aircraft propulsion system 20 may include a single bleed circuit 102. In other embodiments, however, the bleed circuit 102 may be one of a plurality of bleed circuits 102 arranged circumferentially about the axis 28, 42 in a circumferentially extending array. Some or all of these bleed circuits 102 may be fluidly discrete. The multiple bleed circuits 102, for example, may be arranged in parallel between the bypass flowpath 60 and the core flowpath 90, where these multiple bleed circuits 102 may be arranged at (e.g., on, adjacent or proximate) an axially common location along the flowpath(s) 60 and/or 90. With such an arrangement, the multiple bleed circuits 102 may functionally provide an annular bleed path between the flowpaths 60 and 90.

Figure 12:
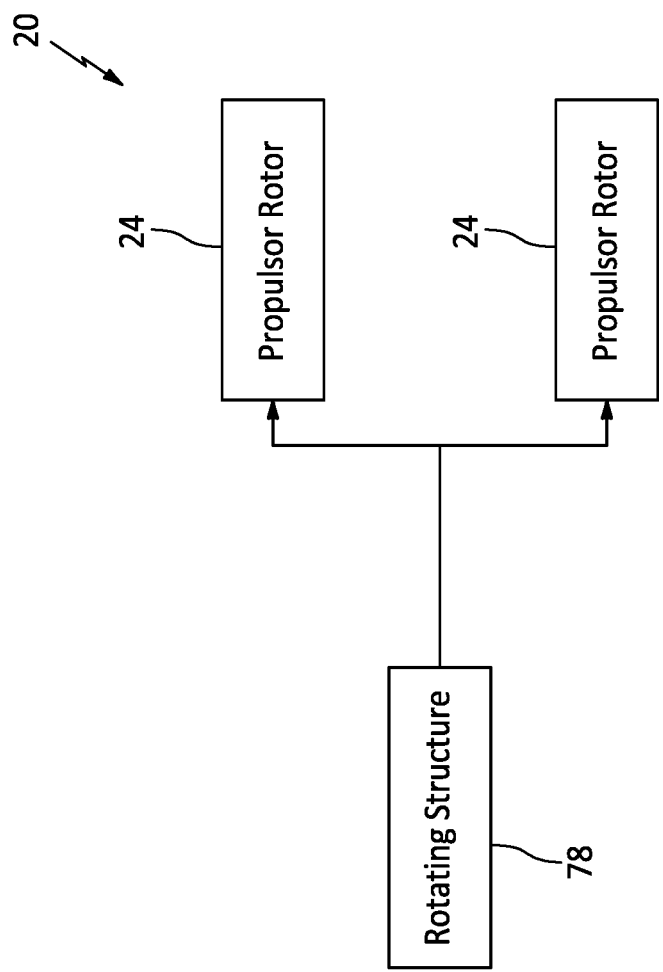
FIG. 12 is a partial schematic illustration of a rotating structure coupled to and driving multiple propulsor rotors for generating propulsive lift.

The engine core 26 may have various configurations other than those described above. The engine core 26, for example, may be configured with a single spool, with two spools (e.g., see FIG. 1), or with more than two spools. The engine core 26 may be configured with one or more axial flow compressor sections, one or more radial flow compressor sections, one or more axial flow turbine sections and/or one or more radial flow turbine sections. The engine core 26 may be configured with any type or configuration of annular, tubular (e.g., CAN), axial flow and/or reverser flow combustor. The present disclosure therefore is not limited to any particular types or configurations of gas turbine engine cores. Furthermore, it is contemplated the engine core 26 of the present disclosure may drive more than the two propulsors. The aircraft propulsion system 20, for example, may include two or more of the first propulsor rotors 22 and/or two or more of the second propulsor rotors 24. For example, the aircraft propulsion system 20 of FIG. 12 includes multiple second propulsor rotors 24 rotatably driven by the low speed rotating structure 78. These second propulsor rotors 24 may rotate about a common axis. Alternatively, each second propulsor rotor 24 may rotate about a discrete axis where, for example, the second propulsor rotors 24 are laterally spaced from one another and coupled to the low speed rotating structure 78 through a power splitting geartrain.

In addition to the foregoing, it is contemplated the bleed circuit 102 may be configured with an aircraft propulsion system/a gas turbine engine without a first and second propulsor rotor arrangement as described above. The bleed circuit 102, for example, may be configured with a turbofan engine, a turbojet engine, a turboprop engine, a turboshaft engine, a propfan engine, a pusher fan engine, an auxiliary power unit (APU) or any other gas turbine engine which would benefit from selectively flowing bleed gas.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:
   an engine core including a compressor section, a combustor section, a turbine section and a core flowpath extending sequentially through the compressor section, the combustor section and the turbine section;
   a bypass duct comprising a bypass flowpath outside of the engine core; and
   a bleed circuit including a bleed passage and a flow regulator;
   the bleed circuit configured to direct bypass gas through the bleed passage from the bypass flowpath into the core flowpath when the flow regulator is in an open position;
   the bleed circuit configured to cutoff gas flow through the bleed passage between the bypass flowpath and the core flowpath when the flow regulator is in a closed position; and
   the bleed circuit configured to direct core gas through the bleed passage from the core flowpath into the bypass flowpath when the flow regulator is in a second open position.

2. The assembly of claim 1, wherein
   the flow regulator includes an outer wall and an inner wall at least partially circumscribed by the outer wall;

the outer wall includes an outer wall first aperture facing upstream within the bypass duct and an outer wall second aperture facing downstream within the bypass duct; and the inner wall comprises an inner wall aperture, and the inner wall is configured to rotate to
the open position where the inner wall aperture is aligned with the outer wall first aperture;
the closed position where the inner wall aperture is covered by the outer wall; and
the second open position where the inner wall aperture is aligned with the outer wall second aperture.

3. The assembly of claim 1, wherein
the compressor section includes a first compressor rotor and a second compressor rotor downstream of the first compressor rotor along the core flowpath; and
the bleed circuit is configured to direct the bypass gas into the core flowpath at a location between the first compressor rotor and the second compressor rotor when the flow regulator is in the open position.

4. The assembly of claim 1, wherein
the compressor section includes a low pressure compressor section; and
the bleed circuit is configured to direct the bypass gas into the core flowpath at a location downstream of the low pressure compressor section when the flow regulator is in the open position.

5. The assembly of claim 1, wherein the flow regulator is configured to move to the open position where the flow regulator opens a first aperture into the bypass duct; and
the closed position where the flow regulator closes the first aperture.

6. The assembly of claim 1, wherein the bleed circuit further includes a scoop configured to direct the bypass gas from the bypass flowpath into the bleed circuit when the flow regulator is in the open position.

7. The assembly of claim 6, wherein the flow regulator forms the scoop when the flow regulator is in the open position.

8. The assembly of claim 1, further comprising:
a second bleed circuit including a second bleed passage and a second flow regulator;
the second bleed circuit configured to direct bypass gas through the second bleed passage from the bypass flowpath into the core flowpath when the second flow regulator is in an open position; and
the second bleed circuit configured to cutoff gas flow through the second bleed passage between the bypass flowpath and the core flowpath when the second flow regulator is in a closed position.

9. An assembly for an aircraft propulsion system, comprising:
an engine core including a compressor section, a combustor section, a turbine section and a core flowpath extending sequentially through the compressor section, the combustor section and the turbine section;
a bypass duct comprising a bypass flowpath outside of the engine core; and
a bleed circuit including a bleed passage and a flow regulator;
the bleed circuit configured to direct bypass gas through the bleed passage from the bypass flowpath into the core flowpath when the flow regulator is in an open position; and
the bleed circuit configured to cutoff gas flow through the bleed passage between the bypass flowpath and the core flowpath when the flow regulator is in a closed position;
wherein the flow regulator is configured to move to: the open position where the flow regulator opens a first aperture into the bypass duct, and the closed position where the flow regulator closes the first aperture;
wherein the flow regulator is configured to move to a second open position where the flow regulator opens a second aperture into the bypass duct; and
wherein the flow regulator closes the second aperture when in the closed position.

10. The assembly of claim 9, wherein
the flow regulator closes the first aperture when in the second open position; and
the flow regulator closes the second aperture when in the open position.

11. The assembly of claim 9, wherein the second aperture is disposed downstream of the first aperture along the bypass flowpath.

12. The assembly of claim 9, wherein
the engine core extends along an axial centerline;
the flow regulator includes a valve element configured to open and close the first aperture; and
the valve element is configured to move axially along the axial centerline between the open position and the closed position.

13. The assembly of claim 9, wherein
the engine core extends along an axial centerline;
the flow regulator includes a valve element configured to open and close the first aperture; and
the valve element is configured to move circumferentially about the axial centerline between the open position and the closed position.

14. The assembly of claim 9, wherein
the engine core extends along an axial centerline;
the flow regulator includes a valve element configured to open and close the first aperture; and
the valve element is configured to rotate circumferentially about a regulator axis between the open position and the closed position, and the regulator axis is angularly offset from the axial centerline.

15. An assembly for an aircraft propulsion system, comprising:
an engine core including a compressor section, a combustor section, a turbine section and a core flowpath extending sequentially through the compressor section, the combustor section and the turbine section;
a bypass duct comprising a bypass flowpath outside of the engine core;
a bleed passage fluidly coupled with the core flowpath; and
a flow regulator configured to
fluidly couple the bleed passage with a first opening into the bypass flowpath during a first mode, and fluidly decouple the bleed passage from a second opening into the bypass flowpath during the first mode; and
fluidly couple the bleed passage with the second opening into the bypass flowpath during a second mode, and fluidly decouple the bleed passage from the first opening during the second mode.

16. The assembly of claim 15, wherein the flow regulator is configured to fluidly decouple the bleed passage from the first opening and the second opening during a third mode.

17. The assembly of claim 15, wherein the flow regulator comprises a two-way valve.

\* \* \* \* \*